United States Patent [19]
Gor

[11] Patent Number: 5,633,308
[45] Date of Patent: May 27, 1997

[54] POLYESTER-RESIN COATING AND DRUM LINER MADE THEREFROM

[75] Inventor: Vishnu Gor, Orland Park, Ill.

[73] Assignee: Gor Corporation, Chicago, Ill.

[21] Appl. No.: 437,651

[22] Filed: May 8, 1995

Related U.S. Application Data

[63] Continuation of Ser. No. 18,070, Feb. 16, 1993, abandoned.

[51] Int. Cl.$^6$ ........................................................ C08K 3/10
[52] U.S. Cl. ........................ 524/537; 524/537; 524/540; 524/541
[58] Field of Search .................................. 524/537, 539, 524/540, 541

[56] References Cited

U.S. PATENT DOCUMENTS

| | | | |
|---|---|---|---|
| 4,504,609 | 3/1985 | Kuwajima et al. | 524/502 |
| 4,578,448 | 3/1986 | Brode et al. | 528/139 |
| 5,178,646 | 1/1993 | Barber, Jr. et al. | 51/298 |
| 5,258,471 | 11/1993 | Nield et al. | 525/438 |

OTHER PUBLICATIONS

"Steel Drum Interiors Use VOC–Compliant Coating", Modern Paint Coatings, Nov. 1990, pp. 32–33.
"Test Chart Manual", Whittaker Corporation, 1988.
"Phenolic Resins", Federation Series on Coatings Technology, Unit Eighteen, Mar., 1971.

*Primary Examiner*—Edward J. Cain
*Attorney, Agent, or Firm*—Milton Gerstein; Marvin Benn

[57] ABSTRACT

A coating that may be used in all environments where a protective coating is applied to a metal, such as for use in coating coils, for coating the interior of cans or beverage containers, and as well as for a host of other uses where protective coatings and films are applied to a metal. Specifically provided is a lining for the interior of steel drums and pails, which lining has very low levels of volatile organic compounds, while still having superior hardness and flexibility. The coating and drum-lining made from the coating is essentially a water-base, thereby effectively eliminating the problem of VOC-emission. The coating of the invention for use in all metal-coating environments is made from a water-base polyester-resin, and the steel-drum lining made from this water-based polyester-resin coating is a water-base phenolic coating.

6 Claims, 1 Drawing Sheet

POLYESTER-RESIN COATING AND DRUM LINER MADE THEREFROM

This is a continuation of co-pending application Ser. No. 08/018,070 filed on Feb. 16, 1993, now abandoned.

BACKGROUND OF THE INVENTION

The present invention is directed to a coating made from a polyester resin, and to a liner for drums made from the polyester resin coating.

Steel drums, or pails, such as 55-gallon drums and 5-gallon pails, often require an interior protective lining in order to protect the contents in the drum. Currently-used protective liners contain primarily organic solvent bases. An example of such an organic solvent base liner, which is extensively used, is an epoxy/phenolic coating, such as "Sterilkote" produced by Russell-Stanley Corp., of Woodbridge, N.J. The problem with the conventional, organic solvent base, protective drum-linings is that they are high in volatile organic compound (VOC). Standards set by the Environmental Protection Agency (EPA), enacted to reduce solvent emissions, require that no more than 4.3 pounds of VOC per gallon of coating may be used for drum and pail interior, protective linings. While some currently-sold organic solvent base drum-linings do meet such strict EPA requirements, a lining that provides even lower VOC's would be highly advantageous. Such a low VOC lining should also be inert to reaction with all of the many corrosive materials packaged in steel drums and pails, in order to prevent contamination, and needs to have a low enough viscosity, in order to allow it to be sprayed, or otherwise, applied to the interior of a drum or pail, by conventional application-techniques, as well as being sufficiently hard and flexible, in order to serve as a drum-lining. The present invention provides a new drum or pail interior lining that has low VOC levels, yet also provides lining-qualities superior in performance to conventionally-used solvent-based linings.

SUMMARY OF THE INVENTION

It is the primary objective of the present invention to provide a novel coating or protective covering that may be used in all environments where a protective coating is applied to a metal, such as for use in coating coils, for coating the interior of cans or beverage containers, and as well as for a host of other uses where protective coatings and films are applied to a metal.

It is the primary objective of the present invention to specifically provide a lining for the interior of steel drums and pails which has very low levels of volatile organic compounds, which incorporates the novel coating of the invention therein, which drum-lining has superior hardness and flexibility, as well as other superior properties necessary for a steel-drum lining, as compared to conventional steel-drum linings.

It is an object of the present invention to provide such a novel coating and such a novel steel-drum lining which are mostly contain a water-base rather than an organic solvent base, thereby effectively eliminating the problem of VOC-emissions.

The novel coating of the invention for use in all metal-coating environments is made from a water-base polyester-resin, and the steel-drum lining made from this water-base polyester-resin coating is a water-base phenolic coating.

BRIEF DESCRIPTION OF THE DRAWINGS

The invention will be more readily understood with reference to the accompanying drawing, wherein.

DETAILED DESCRIPTION OF THE INVENTION

Figure 1:
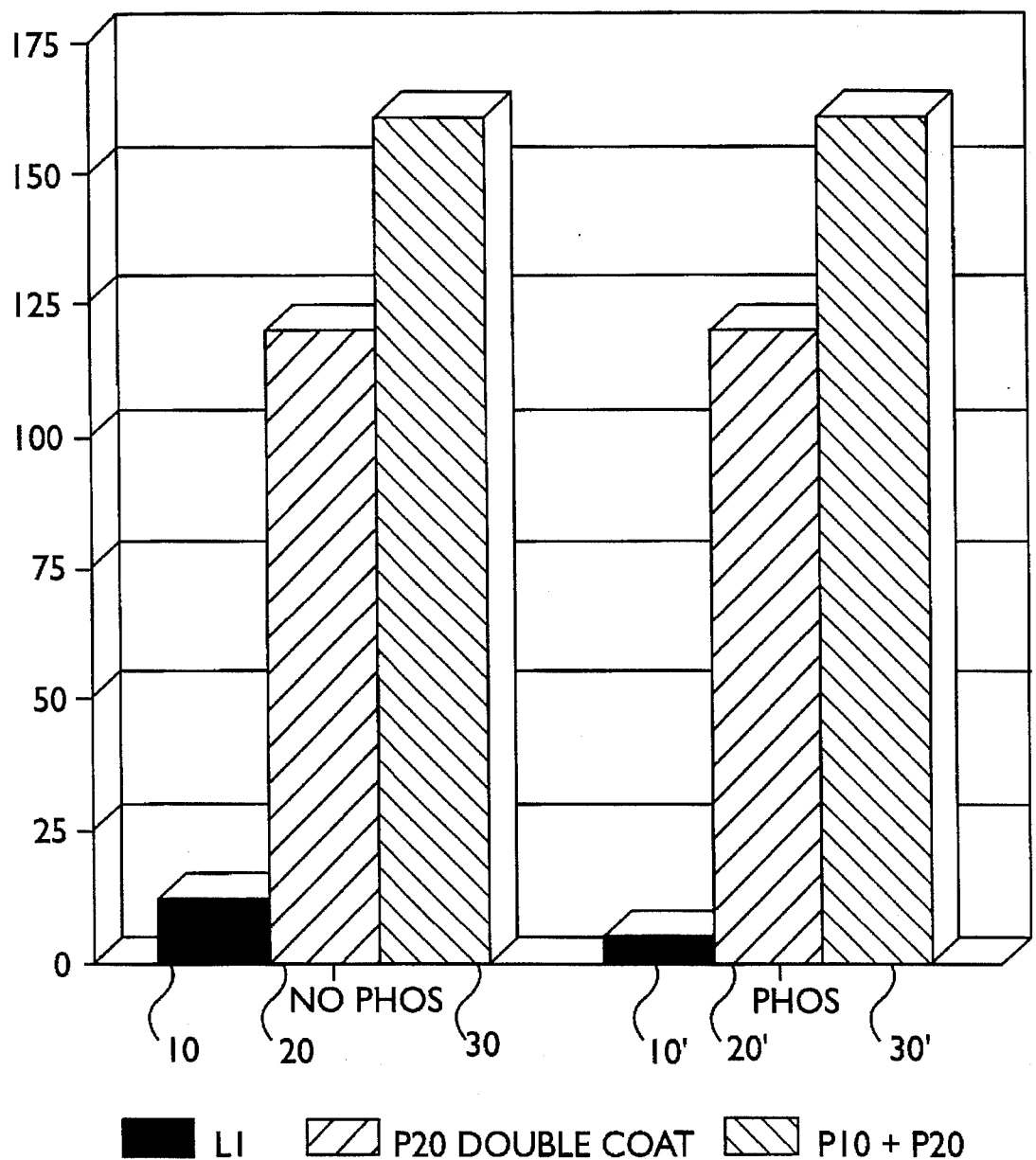
FIG. 1 is a graph showing the test results comparing drum-lining coatings of the present invention compared to conventional solvent-base, phenolic coatings.

The novel coating of the invention for use in all environments where metal is coated, such as in beverage cans or tins, coils, etc., is a water-base polyester resin. According to the invention, the coating is made from a water soluble polyester and cross-linked with melamine type organic resin which contains less than ten percent of organic solvent. The polyester resin is formulated from one of five different formulations, as set forth in Table 1 hereinbelow.

TABLE I

| | Resin Formulations | | | | |
| --- | --- | --- | --- | --- | --- |
| | Parts by Weight | | | | |
| Materials | P.E.3823 (PEI-A) | P.E.3823 (TOFA) | P.E.300 | P.E.74/18 | 3712NPF |
| Timellitic Anhydride (TMA) | 200–300 | 200–300 | 168 | 86 | 355 |
| Isophthalic Acid (IPA) | — | — | 655 | 323 | — |
| Adipic Acid | — | — | 192 | 94 | 90 |
| Neopentyl Glycol | 300–500 | 300–400 | 685 | 169 | 450 |
| Pelargonic Acid | 200–300 | — | — | — | 198 |
| Tall Oil Fatty Acid | — | 356 | — | — | — |
| Glycidyl Ester of Versatic Acid 1 | — | — | — | 399 | — |

The preferred formulation for each is as follows:

Resin Formulations

| | Parts by Weight | | | | |
|---|---|---|---|---|---|
| Materials | P.E.3823 (PEI-A) | P.E.3823 (TOFA) | P.E.300 | P.E.74/18 | 3712NPF |
| Trimellitic Anhydride (TMA) | 291 | 240 | 168 | 86 | 355 |
| Isophthalic Acid (IPA) | — | — | 655 | 323 | — |
| Adipic Acid | — | — | 192 | 94 | 90 |
| Neopentyl Glycol | 419 | 346 | 685 | 169 | 450 |
| Pelargonic Acid | 239 | — | — | — | 198 |
| Tall Oil Fatty Acid | — | 356 | — | — | — |
| Glycidyl Ester of Versatic Acid 1 | — | — | — | 399 | — |
| | 1116 | 1080 | 1700 | 1071 | 1093 |
| Less water of reaction | 116 | 80 | 200 | 71 | 93 |
| Yield | 1000 | 1000 | 1500 −500 | 1000 | 1000 |
| | | | 1000 | | |

Of these five formulations, the first two, P.E. 3823 (PELA—Pelargonic Acid) and P.E. (TOFA—Tall Oil Fatty Acid) provide the most superior characteristics for use in a coating.

The ingredients of each polyester resin shown above is cooked, in a conventional manner, known to those skilled in the art. For example, for producing P.E. 3823 (TOFA type), the following pilot kettle batch is a preferred manner of cooking:

Batch Size: 375 pound yield (solid), 500 pounds at 75% NVM

| Material | Weight (lbs.) | Mole Ratio |
|---|---|---|
| 1. Neopentyl glycol, NPG | 130.6 | 8.00 |
| 2. Isophthalic acid, IPA-99 | 52.1 | 2.00 |
| 3. Trimellitic anhydride, TMA | 53.4 | 1.77 |
| 4. Tall oil fatty acid, Acintol FA-1 | 134.2 | 3.00 |
| 5. Trimellitic anhydride, TMA | 37.1 | 1.23 |
| | 407.4 | |
| Less water of esterification | −32.4 | |
| Yield at 36 A.N. | 375.0 | |
| 6. Ethylene glycol mono butyl ether | 125.0 | |
| | 500.0 | Total at 75% NVM |

Processing Procedure:

1. Charge neopentyl glycol, isophthalic acid, and first state trimellitic anhydride to reactor equipped with agitator, inert gas sparge and steam heated partial condenser.

2. Slowly heat the materials, begin agitation at about 90° C.(2000° F.) and continue heating to a maximum temperature 232°–238° C. (450°–460° F.) while maintaining a maximum overhead temperature of 102° C. (215° F.). Use 5–10 lb. steam on the partial condenser to help maintain overhead temperature.

3. Hold for an acid number of less than 10.

4. Cool to 200° C. (390° F.), charge tall oil fatty acid, and then reheat to 220°–227° C.(430°–440° F.).

5. Hold for an acid number of less than 10 and a viscosity at 80% NVM in ethylene glycol mono butyl ether of T+ (Gardner-Holdt).

6. Cool to 200° C. (390° F.), add final stage trimellitic anhydride, and reheat to 205°–210° C. (400°–410° F.). Alternately, cool to 121° C. (250° F.), and hold overnight with 10 pound steam on kettle jacket. Then reheat to 177° C. (350° F.), add final stage trimellitic anhydride, and continue heating to 205°–210° C. (400°–410° F.).

7. Hold for an acid number of 42–44.

8. Cool to 177°–160° C. (350°–320° F.) and hold for an acid number of 35–37.

9. Thin in the kettle with ethylene glycol mono butyl ether to 75% NVM.

10. Package in a lined drum with excess in five gallon pails.

11. Determine final properties of polymer as follows:

| | Specification |
|---|---|
| Acid number, solids | 35–37 |
| Viscosity, Gardner-Holdt | Z4 |
| Color, Gardner | 5–7 |
| NVM, % | 75 |
| Volatile | 75 |
| Density, lb./gal. | Ethylene glycol mono butly ether |

The coating itself is formed by mixing the respective polyester resin cooked as above, according to the formulation shown in Table 2, hereinbelow.

TABLE 2

| Materials | Parts by Weight | | | | |
|---|---|---|---|---|---|
| | P.E.3823 (PELA) | P.E.3823 (TOFA) | P.E.300 | P.E.74/18 | 3712NPF |
| Coating Formulation | | | | | |
| 2 Dimethyl amino ethanol | 40–80 | 40–80 | 40–80 | 40–80 | 40–80 |
| Crosslinker-Hexamethoxy-methylmelamine | 200–400 | 200–400 | 200–400 | 200–400 | 200–400 |
| Distilled Water | 2000–3000 | 2000–3000 | 2000–3000 | 2000–3000 | 2000–3000 |

Theoretically, following chemical cross-linking, reaction will occur with Methoxy methyl functionality of Hexamethoxy methyl melamine.

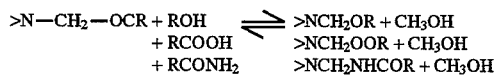

```
>N—CH2—OCR + ROH  ⇌  >NCH2OR + CH3OH
           + RCOOH      >NCH2OOR + CH3OH
           + RCONH2     >NCH2NHCOR + CH3OH
```

The properties exhibited by each coating are shown in Table 3, hereinbelow.

The properties exhibited by the coating formulation on Table 4, is as shown in Table 5, hereinbeolow.

TABLE 3

| Materials | Parts by Weight | | | | |
|---|---|---|---|---|---|
| | P.E.3823 (PELA) | P.E.3823 (TOFA) | P.E.300 | P.E.74/18 | 3712NPF |
| Solution Properties | | | | | |
| Resin/Crosslinker Ratio | 50/80 10/30 | 50/80 10/30 | 50/80 10/30 | 50/80 10/30 | 50/80 10/30 |
| Water/Solvent Ratio | 50/100 10/20 | 50/100 10/20 | 50/100 10/20 | 50/100 10/20 | 50/100 10/20 |
| NVM-% | 25–45 | 25–45 | 25–45 | 25–45 | 25–45 |
| Initial Ph | 7.5 +/− 1 | 7.5 +/− 1 | 7.5 +/− 1 | 7.5 +/− 1 | 7.5 +/− 1 |
| Viscosity Zahn Cup#2 seconds | 100 +/− 30 | 100 +/− 30 | 100 +/− 30 | 100 +/− 30 | 100 +/− 30 |

The preferred coating formulation is as shown in Table 4, hereinbelow.

TABLE 4

| Materials | Parts by Weight | | | | |
|---|---|---|---|---|---|
| | P.E.3823 (PELA) | P.E.3823 (TOFA) | P.E.300 | P.E.74/18 | 3712NPF |
| Coating Formulation | | | | | |
| 2 Dimethyl amino ethanol | 60 | 60 | 60 | 60 | 60 |
| Crosslinker-Hexamethoxy Methyl Melamine | 280 | 280 | 280 | 280 | 280 |
| Distilled Water | 2450 | 2450 | 2450 | 2450 | 2450 |
| | 3790 | 3790 | 3790 | 3790 | 3790 |

TABLE 5

| Materials | Parts by Weight | | | | |
|---|---|---|---|---|---|
| | P.E.3823 (PELA) | P.E.3823 (TOFA) | P.E.300 | P.E.74/18 | 3712NPF |
| Solution Properties | | | | | |
| Resin/Cross-linker Ratio | 80/20 | 80/20 | 80/20 | 80/20 | 80/20 |
| Water/Solvent Ratio | 86/14 | 86/14 | 86/14 | 86/14 | 86/14 |
| NVM-% | 30–33 | 30–33 | 30–33 | 30–33 | 30–33 |
| Initial Ph | 7.5 +/− 1 | 7.5 +/− 1 | 7.5 +/− 1 | 7.5 +/− 1 | 7.5 +/− 1 |
| Viscosity Zahn Cup #2 seconds | 100 +/− 10 | 100 +/− 10 | 100 +/− 10 | 100 +/− 10 | 100 +/− 10 |

A comparison of the final polyester coatings to each other after having been subjected to conventional testing techniques, as well as their comparison to a conventional solvent-based coating, is shown in table 6 hereinbelow.

suitable application. Also baking cycle can be adjusted at the required film weight. The product is typically packaged in 55 gallon steel drums. Storage requirements are such that it is be to be stored in combustible liquid storage area. Storage

TABLE 6

EVALUATION RESULTS

Application: Dip Coat
Substrate: Cold Rolled Steel
Film Thickness: .5 mil, average
Cure Schedule: PolyEnviro systems, 30 minutes at 350° F.
Solvent system, 15 minutes at 395° F.
Chemical testing: Spot testing at room temperature covered by watchglass
Ratings: Visual evaluation No change = 0, very slight = 1, slight = 2, moderate = 3, considerable = 4, severe = 5

| Materials | P.E.3823 (PELA) | | | P.E.3823 (TOFA) | | | P.E.300 | | | P.E.74/18 | | | 3712NPF | | |
|---|---|---|---|---|---|---|---|---|---|---|---|---|---|---|---|
| hours exposure | 24 | 48 | 72 | 24 | 48 | 72 | 24 | 48 | 72 | 24 | 48 | 72 | 24 | 48 | 72 |
| 10% Sodium Chloride | 0 | 0 | 0 | 0 | 0 | 0 | 0 | 0 | 1 | 0 | 0 | 1 | 0 | 0 | 0 | 0 | 0 | 0 |
| 10% Hydrochloric Acid | 0 | 0 | 0 | 0 | 0 | 2 | 2 | 3–4 | 5 | 0 | 0 | 2–3 | 3 | 5 | 5 | 0 | 0 | 1–2 |
| 10% Sulfuric Acid | 0 | 0 | 0 | 0 | 0 | 0 | 0 | 2 | 4–5 | 0 | 0 | 0 | 0 | 0 | 4 | 0 | 0 | 0–1 |
| 10% Acetic Acid | 0 | 0 | 0 | 0 | 0 | 0 | 0 | 1 | 1–2 | 2–3 | 3–4 | 5 | 1–2 | 3 | 5 | 3 | 5 | 5 |
| 10% Phosphoric Acid | 0 | 0 | 0 | 0 | 0 | 0 | 0 | 1–2 | 2–3 | 0 | 0 | 1 | 0 | 0 | 1 | 0 | 1–2 | 4 |
| 10% Sodium Hydroxide | 0 | 0 | 0 | 0 | 0 | 0 | 0 | 0 | 1 | 2–3 | 5 | 5 | 0 | 0 | 1 | 5 | 5 | 5 |
| 10% Ethanol | 0 | 0 | 0 | 0 | 0 | 0 | 0 | 0 | 0 | 0 | 0 | 1 | 0 | 0 | 0 | 0 | 0 | 1 |
| Distilled Water | 0 | 0 | 0 | 0 | 0 | 0 | 0 | 0 | 0 | 0 | 0 | 0 | 0 | 0 | 0 | 0 | 0 | 0 |
| Calcium Hypochlorite[2] | 0 | 1–2 | 3 | 0 | 1–2 | 3–4 | 0 | 1–2 | 1–2 | 0 | 2 | 3–4 | 0 | 1–2 | 2–3 | 0 | 1–2 | 3–4 |

The above table shows the superior properties of each of the water-base polyester resin coatings as compared to a conventional solvent-based coating, as well as the superiority of the P.E. 3823 (TOFA) as compared to the other polyester resin coatings of the invention, with regards to being inert to the corrosive materials shown.

The water soluble, organic coating P.E. 3823 (TOFA) contains less than ten percent of organic solvent, and can be applied to a metal substrate by rollcoating, spraying or dipping. Typical properties of the P.E. 3823 (TOFA) are shown in Table 7:

TABLE 7

| APPEARANCE: | Yellowish-white viscous liquid |
|---|---|
| SPECIFIC GRAVITY: | 1.15 + 0.05 |
| DENSITY: | 8.98 lbs/gal |
| VISCOSITY: | 50–60 sec. (Zohn cup #2) |
| pH: | 8.5 ± 0.5 |

The recommended application of the P.E. 3823 (TOFA) is to adjust the proper viscosity by adding distilled water for should be away from heat, ignition sources and open flame in accordance with applicable federal, state or local regulations. The container should be kept closed, and the product should not be allowed to freeze.

One very important, and critical, characteristic of all of the water-base polyester coatings of the invention is the low level of volatile organic compound (VOC). For P.E. 3823:

| VOC DATA SHEET | | |
|---|---|---|
| A. | COATING SP. GRAVITY: | 1.15 + 0.05 |
| | Density: | 8.95 lbs/gal |
| B. | TOTAL VOLATILES: | 65 wgt per cent |
| C. | WATER CONTENT: | 58.5 wgt per cent |
| D. | ORGANIC VOLATILE: | 6.5 wgt per cent |
| E. | NONVOLATILE CONTENT: | 35 wgt per cent |
| G. | VOC CONTENT: | 1.17 lbs/gal (less water). |

As can be seen, the 1.17 lbs./gal is considerably below the 4.3 lbs./gal. requirement set by the EPA, as discussed above, as is also considerably less than presently-used, low-level VOC, primarily organic solvent base, steel-drum linings.

Each of the novel, water-base phenolic drum-lining compounds of the invention uses the novel P.E. 3823 (TOFA) or P.E. 3823 (PELA) as one of its main ingredients. Shown in Table 9 are formulations, by weight-percentage, of three such novel drum-lining compounds, each of which includes one of the P.E. 3823 (TOFA) or P.E. 3823 (PELA), a phenolic, and a crosslinking agent; also shown are the properties of the baked film.

TABLE 8

|  | P.E. 5 | P.E. 10 | P.E. 15 |
| --- | --- | --- | --- |
| P.E. 3823 TOFA | — | 20.0–35.0 | — |
| P.E. 3823 PELA | 25.0–32.0 | — | 20.0–40.0 |
| 2-Dimethyl Amino Ethanol | 0.5–1.5 | 1.0–3.0 | 1.0–4.0 |
| Crosslinker Hexamethoxy Methyl Melamine | 3.0–8.0 | 5.0–12.0 | |
| Polsolv EB | 1.0–3.0 | 2.0–6.0 | 1.0–6.0 |
| Distilled water | 55.5–70.5 | 44.0–72.0 | 45.0–77.0 |
| Crosslinker DER 331 | — | — | 1.0–5.0 |

Draw down on phosphatized steel carbon plate. Bake @ 450° F. for 10 minutes.
PROPERTIES OF BAKED FILM

| Film Hardness | hard | very hard | soft |
| --- | --- | --- | --- |
| MEK Rubs | 50 | 100+ | 10 |
| Adhesion | good | excellent | marginal |
| Appearance | yellowish | yellowish | whitish |

The preferred formulation is as shown in Table 9:

TABLE 9

|  | P.E. 5 | P.E. 10 | P.E. 15 |
| --- | --- | --- | --- |
| P.E. 3823 TOFA | — | 28 | |
| P.E. 3823 PELA | 31.4 | — | 30.2 |
| 2-Dimethyl Amino Ethanol | 1.2 | 2.8 | 1.2 |
| Crosslinker Cymel | 6.0 | 9.4 | |
| Polsolv EB | 2.4 | 3.7 | |
| Distilled water | 59.0 | 56.1 | 60.5 |
| Crosslinker DER 331 | — | — | 2.3 |

Draw down on phosphatized steel carbon plate. Bake @ 450° F. for 10 minutes.

The fourth, and preferred, novel, water-base phenolic drum-lining compound of the invention uses the novel P.E. 3823 (TOFA) only, and has the formulation, by weight-percentage, as shown in Table 10, hereinbelow; also shown are the properties.

TABLE 10

|  | P.E. 20 |
| --- | --- |
| PKHW-35 | 6.0–15.0 |
| Deionized H$_2$ | 20.0–30.0 |
| Butyl Cellosolve | 2.0–4.0 |
| P.E. 2392 | 30.0–50.0 |
| P.E. 3823 TOFA | 2.0–4.0 |
| Deionized H$_2$O | 20.0–40.0 |
| Properties | |

PH = 8.0 +/– 1.0
Viscosity = 85 +/– 10 Seconds Zohn's Cup #2

The preferred formulation for this fourth product is as follows:

|  | P.E. 20 |
| --- | --- |
| PKHW-35 | 12 |
| Deionized H$_2$O | 25 |
| Butyl Cellosolve | 3 |
| P.E. 2392 | 46 |
| P.E. 3823 TOFA | 3 |
| Deionized H$_2$O | 11 |
|  | 100 |
| Properties | |

PH = 8.0 +/– 1.0
Viscosity = 85 +/– 10 Seconds Zohn's Cup #2

The element P.E. 2392 is a unique, proprietary, commercially- available phenolic resin made and sold by Poly Enviro Laboratory, Inc. of Alsip, Ill.

FIG. 1 shows the hardness properties of the water-base phenolic-resin drum-lining coatings of the present invention in comparison to the conventional solvent-base, phenolic drum-lining coatings. The results shown are for reverse-impact tests, and the bars 10,10' shown in black are for a conventional solvent-base, phenolic drum-lining coating, while the first cross-hatched bars 20, 20' are for the P20 water-base phenolic-resin drum-lining coating of the present invention detailed in Table 10, above, while the third cross-hatched bars 30, 30' are for a combination of the 0.5 mil thick outer layer of P20 coating compound over an inner, 0.5 mil thick layer of P10 coating compound detailed in Table 10, above. The measured values on the ordinate axis are lbs./sq.in. The first set of bar graphs 10, 20, 30 are for coatings on non-phosphatized steel, while the bar graphs 10', 20', and 30' are for coatings on phosphatized steel. As can be readily seen, not only do the water-base, phenolic-resin, drum-lining coatings of the invention provide very low levels of VOC, but, also, at least the preferred P20 compound of Table 6 provides superior hardness as compared to the conventional, solvent-based phenolic coatings for drum linings.

While a specific embodiment of the invention has been shown and described, it is to be understood that numerous changes and modifications may be made therein without departing from the scope, spirit and intent of the invention as set forth in the appended claims.

What I claim is:

1. A steel-drum coating composition for lining the interior of steel drums and pails, comprising:

a polyester-resin coating; and solvent;
   said polyester-resin coating comprising:
   a polyester-resin composition; said coating further comprising crosslinking agent, and phenolic resin;
   said solvent comprising water in the range of between approximately 20.0%–77.0% by weight of the total coating composition;
   said solvent further comprising a small amount by weight of organic solvent;
   said phenolic resin comprising, at least in part, water-dispersible phenol-formaldehyde condensate containing Bisphenol A, said Bisphenol A being provided in the range of between 30.0% and 50.0% by weight of the total coating composition.

2. A steel-drum coating composition for lining the interior of steel drums and pails according to claim 1, wherein said crosslinking agent is in the range of approximately 6.0%–15.0% by weight of the total coating composition.

3. A steel-drum coating composition for lining the interior of steel drums and pails according to claim 1, wherein said solvent comprises deionized water in the range of between approximately 40%–70% by weight of the total coating.

4. A steel-drum coating composition for lining the interior of steel drums and pails according to claim 1, wherein said polyestyer-resin coating is in the range of between 2.0%–4.0% by weight of the total coating and comprises:

a polyester-resin composition and a solvent base mixed with said polyester-resin composition, said polyester-resin composition comprising:
trimellitic anhydride;
neopentyl glycol; and
tall oil fatty acid;
said base comprising:
an organic solvent;
crosslinker; and
distilled water.

5. A steel-drum coating composition for lining the interior of steel drums and pails according to claim 4, wherein said polyester-resin composition comprises tall oil fatty acid in the amount of about 35.6% by weight of the total said polyester-resin composition; said organic solvent comprising 2 Dimethyl amino ethanol in the amount of about 1.6% by weight of the total base, said crosslinker in the amount of about 7.4% by weight of the base of said polyester-resin composition, and said distilled water in the amount of about 64.6% by weight of the total base.

6. A steel-drum coating composition for lining the interior of steel drums and pails, comprising:

a polyester-resin coating in the range of between 2.0%–4.0% by weight;

deionized water in the range of the between 20.0%–70.0% by weight;

phenolic resin;

crosslinking agent;

and a small amount by weight of organic solvent;

said phenolic resin including water-dispersible phenol-formaldehyde condensate containing Bisphenol A, said Bisphenol A being provided in the range of between approximately 30.0%–50.0% by weight of the total coating composition.

* * * * *